United States Patent [19]

Carletti

[11] Patent Number: 5,467,592
[45] Date of Patent: Nov. 21, 1995

[54] SECTORIZED TUBULAR STRUCTURE SUBJECT TO IMPLOSION

[75] Inventor: Ollivier Carletti, Vaux le Penil, France

[73] Assignee: Societe Nationale d'Etude et de Construction de Moteurs d'Aviation "Snecma", Paris, France

[21] Appl. No.: 267,541

[22] Filed: Jun. 29, 1994

[30] Foreign Application Priority Data

Jun. 30, 1993 [FR] France .................. 93 07954

[51] Int. Cl.⁶ .................................................. F02K 3/10
[52] U.S. Cl. .................. 60/261; 60/752; 60/757; 60/39.31; 60/39.32; 403/393
[58] Field of Search ............. 60/261, 262, 752, 60/753, 755, 756, 757, 39.31, 39.32; 403/393

[56] References Cited

U.S. PATENT DOCUMENTS

| | | | |
|---|---|---|---|
| 3,826,088 | 7/1974 | Nash et al. | 60/261 |
| 4,109,459 | 8/1978 | Ekstedt et al. | 60/757 |
| 4,480,436 | 11/1984 | Maclin | 60/752 |
| 4,512,682 | 4/1985 | Mungons | 403/393 |
| 4,628,694 | 12/1986 | Kelm et al. | 60/752 |
| 4,706,453 | 11/1987 | Vivace . | |
| 4,748,806 | 6/1988 | Drobny | 60/752 |
| 4,773,227 | 9/1988 | Chabis | 60/752 |
| 4,838,584 | 6/1989 | Dierksmeier . | |
| 4,864,828 | 9/1989 | Matheny et al. | 60/757 |
| 5,113,660 | 5/1992 | Able et al. | 60/752 |
| 5,144,793 | 9/1992 | Able et al. | 60/757 |
| 5,297,385 | 3/1994 | Dubell et al. | 60/757 |
| 5,335,490 | 8/1994 | Johnson et al. | 60/261 |

FOREIGN PATENT DOCUMENTS

| | | | |
|---|---|---|---|
| 71391 | 12/1959 | France | 60/752 |
| 2646880 | 11/1990 | France . | |
| 2657119 | 7/1991 | France . | |
| 3535442 | 4/1987 | Germany | 60/752 |
| 2074308 | 10/1981 | United Kingdom | 60/752 |

OTHER PUBLICATIONS

Patent Abstracts of Japan vol. 10, No. 381 (M–547)(2438) Dec. 19, 1986, JP–A–61 173 024 Aug. 4, 1986.

*Primary Examiner*—Richard A. Bertsch
*Assistant Examiner*—Howard R. Richman
*Attorney, Agent, or Firm*—Oblon, Spivak, McClelland, Maier & Neustadt

[57] ABSTRACT

A sectorized tubular structure able to resist implosion pressures, especially at the links between annular sectors. The tubular structure includes annular sectors interconnected by flat linking elements, each including at its ends at least one projection whose end enables the annular sectors to be supported. Thus, each linking element ensures the transmission of forces from one annular element to another. The unit is supported by fixing screws which are never in contact with the two annular sectors to be kept assembled.

7 Claims, 3 Drawing Sheets

SECTORIZED TUBULAR STRUCTURE SUBJECT TO IMPLOSION

FIELD OF THE INVENTION

The present invention concerns the design of sectorized tubular structures subject to implosion, such as the thermal protection jackets used in post-combustion or transition channels in turbojet engines used more particularly in military applications.

BACKGROUND OF THE INVENTION

The majority of supersonic turbojet engines used in military applications are equipped with a post-combustion device. This device appears in the form of a channel situated between the turbine and the nozzle, wherein injection ramps provide a fuel supplement able to complete the combustion of unburnt hydrocarbides in the combustion chamber and thus raise the temperature of the ejection gases. The contribution of fuels is considerable and high temperatures of about 2100° K. are attained (mean ejection temperature). These temperatures may locally reach 2300° K.

For turbojet engines equipped with axisymmetrical nozzles, the channel has a cylindrical shape. As shown on FIG. 1, this channel 6 is connected at its upstream end to the downstream flange of the exhaust housing 4 placed downstream of the combustion chamber 3 and at its downstream end directly at the upstream ferrule 5 of the nozzle 2.

Having regard for the temperatures existing in this type of channel, it is essential to provide a thermal protection jacket. This jacket is kept spaced from the internal wall of the channel and coaxial with the latter by sliding fasteners. A flow of cooling air, which may be the secondary air in the case of a twin-flow turbojet engine, circulates between the internal portion of the channel 6 and the outer wall of the jacket 1.

French patent FR-A-2 646 880 describes a thermal protection jacket formed of a set of tiles overlapping laterally and longitudinally. The rows of successive tiles are offset by a tile half width. The fixing of the upstream tiles is effected by downstream straps traversing windows upstream of the downstream tiles and by clamps. The tiles may be made of metallic, ceramic or composite materials. There is extremely high pressure outside the jacket with respect to the pressure existing inside. The jacket is therefore subjected to both thermal and mechanical stresses. Thus, it undergoes a sort of compression tending towards an implosion phenomenon. The sectors of the jacket need to withstand these significant tangential stresses. For sectors or tiles made of a composite material, it is difficult to have the tangential forces borne by the ends of the tiles due to the pressure difference existing on both sides of the jacket. Accordingly, the forces are taken up by the linking elements.

The aim of the invention is to provide a sectorized tubular structure made of a composite material and working on an implosion principle, while being able to resist tangential stresses at the links between the various sectors of the structure and the linking elements.

SUMMARY OF THE INVENTION

The main object of the invention is a sectorized tubular structure subject to implosion and including:
overlapping annular sectors made of a composite material and forming at least one tubular portion, and
linking elements to fix together the annular sectors of a given stage.

According to the invention, the linking elements are metallic plates comprising a central portion and at least two edges perpendicular to the central portion and parallel to each other with an annular sector resting on each of said edges.

In the main embodiment of these linking elements, at least one central hole is provided in the central portion of these elements and fixing holes are also provided at the ends of the annular elements.

The structure is advantageously completed with clamping fixing means placed in the holes of the annular sectors and the linking elements, the diameters of the fixing means being smaller than the diameters of the holes of the annular sectors and linking elements so that there is no contact between them.

One main embodiment of these linking elements provides that the edges are projections of the plate constituting a central portion of each linking element so as to form a stop in the form of convex surface which engages an annular sector such that the annular sector almost overlaps an entire linking elements on one face of the linking element.

These projections are preferably placed at each end of the linking element.

In one of its embodiments, the invention provides that the central portion has a bent portion with a specific inclination so that the ends of the linking element are not in the same plane but are parallel to one another and the two overlapping annular sectors are spaced from one another by bent portion.

The structure may possibly include by a linear joint placed between two overlapping sectors.

It may also include at least one brace, placed between two annular overlapping sectors.

BRIEF DESCRIPTION OF THE DRAWINGS

The invention and its various technical characteristics shall be more readily understood from a reading of the following description with reference to the accompanying figures on which.

DESCRIPTION OF THE PREFERRED EMBODIMENTS

Figure 1:
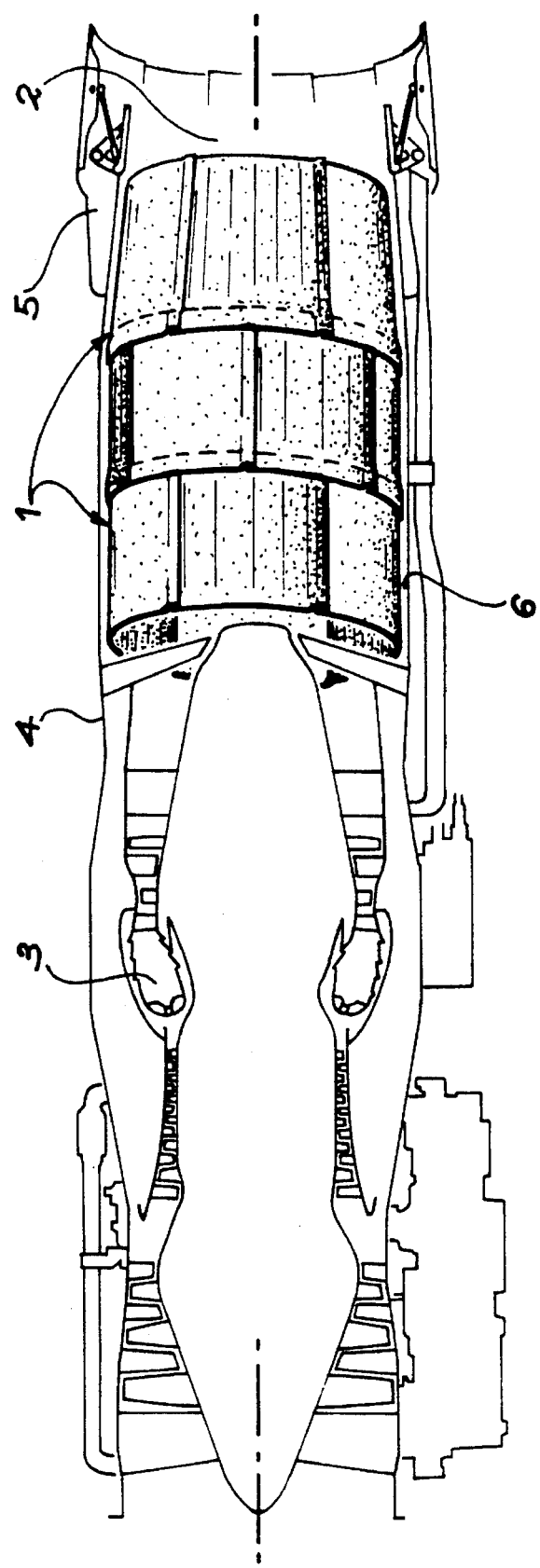
FIG. 1 is a cutaway view of a turbojet engine on which a structure according to the invention is used.
Figure 2:
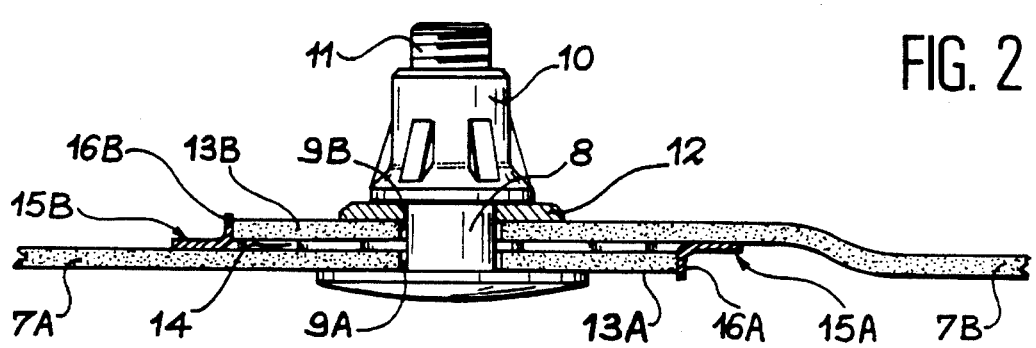
FIG. 2 is a cutaway view of a first detailed embodiment of a junction of the structure of the invention.

With reference to FIG. 2, this figure shows two adjacent annular sectors 7A and 7B respectively. They overlap over a length of several centimeters via their respective ends 13A and 13B. They are fixed by fixing means by screwing. Thus, a screw 8 is shown traversing a hole 9A located at the right end 13A of the first annular sector 7A-and a hole 9B located at the end 13B of the second sector 7B. A screwing nut 10 is screwed on the thread 11 of the screw 8 so as to tighten a washer 12 which forces together the two ends 13A and 13B of the annular sectors 7A and 7B.

Figure 3:
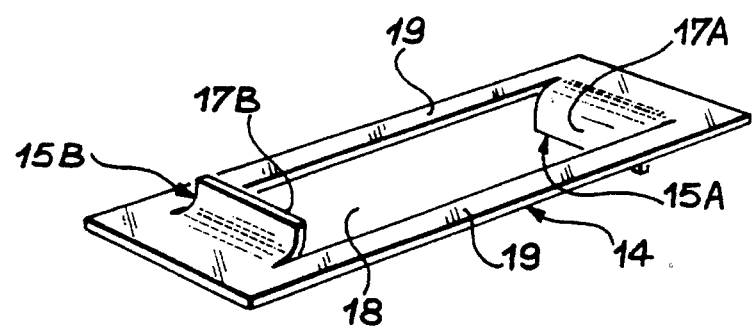
FIGS. 3, 4 and 5 are top views of three different embodiments of the linking elements used in the structure of the invention.

With reference to FIG. 3, the linking element is mainly composed of a non-hatched central portion 14 as it is not located inside the cutting plane of this figure. On the other hand, this linking element includes at each end of its central portion 14 a projection 15A and 15B projecting with respect to the plane of the central portion 14. Each projection 15A and 15B includes an end portion 16A and 16B perpendicular to the plane of the central portion 14 and also perpendicular to the annular sectors 7A and 7B. In this way, each of these two annular sectors 7A and 7B is able to be supported via the respective ends 13A and 13B abutted against a convex face 17A and 17B of the end 16A and 16B of these projections 15A and 15B.

The ends 13A and 13B of the two annular sectors 7A and 7B are each secured to one face of the central portion 14 and are thus separated by a distance corresponding to the thickness of this central portion 14. This enables the ends 13A and 13B to each be fully supported against a rectilinear portion of the convex surface 17A and 17B of the projections 15A and 15B.

It is to be noted that the holes 9A and 9B made in the ends 13A and 13B of the annular sectors 7A and 7A must of necessity be wider than the outer diameter of the screw 8. In fact, the edges constituted by the projections 15A and 15B of the fixing element are used to receive the tangential forces transmitted by the annular sectors 7A and 7B respectively. Accordingly, the fixing screw 8 is never in contact with these annular sectors 7A and 7B, and hence a difference in diameter exists between them and the holes 9A and 9B.

In addition, it is necessary that each end 16A or 16B of the projections 15A or 15B has a length greater than or equal to the thickness of the annular sectors 7A or 7B. With reference to FIG. 3, it can be seen that each projection 15 and 15B may be relatively long, possibly approaching the width of a linking element.

In the case of FIG. 3, the embodiment of the projections 15A and 15B is produced by making an opening 18 in the middle of the linking element and by bending back the plate pieces constituting the ends of this opening 18 on each side. By using a metallic material, linking elements are therefore produced which are able to receive on each projection 15A and 15B the forces of each of the annular sectors which impose a traction force on each linking element which is easily borne by the lateral branches 19 of each linking element.

Figure 4:
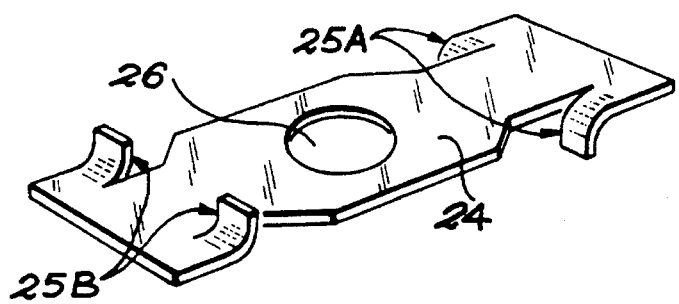

FIG. 4 desribes a second embodiment where the projections are constituted, not by convex faces of a central hole of a linking element, but by its lateral edges. Thus, located at each end is not one but two projections 25A placed laterally. In this case, a central hole 26 is provided in the central portion 24 of the linking element. Of course, the diameter of the hole 26 is larger than the diameter of the fixing screw 8.

Figure 5:
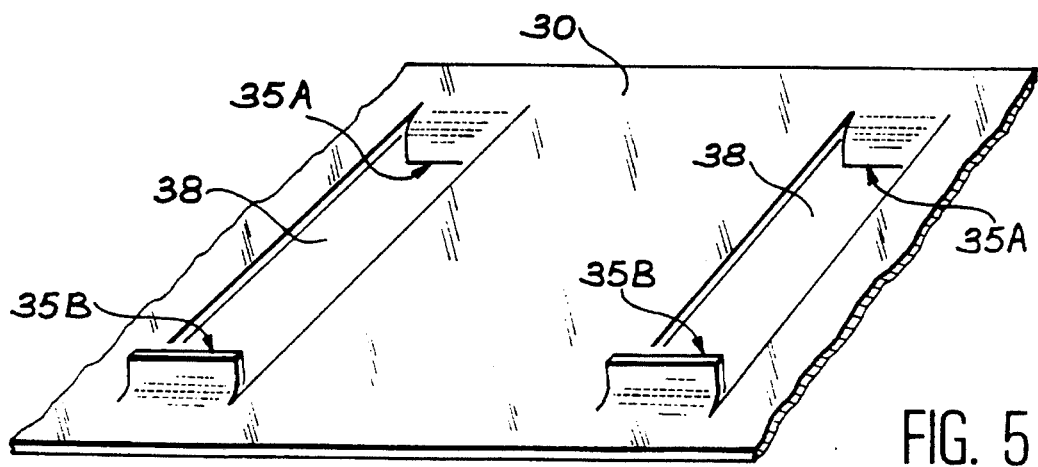

With reference to FIG. 5, a third embodiment provides a linking element wider than the preceding linking elements. It is constituted by a wide plate 30 pierced with two rectangular openings 38 made perpendicularly with respect to the large side of this plate 30. Each end of these openings 38 constitutes a projection 35B or 35A able to receive relatively wide annular sectors.

Figure 6:
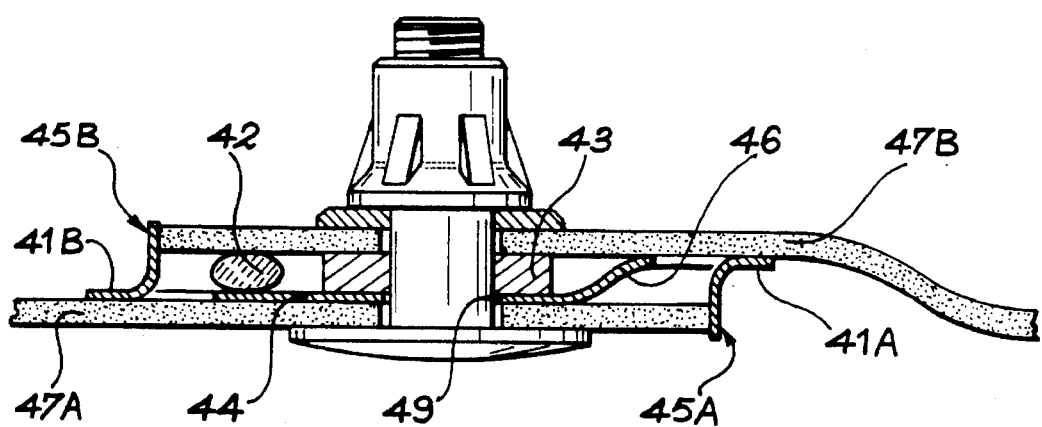
FIG. 6 is a sectional view of a second embodiment of the junction used in the structure of the invention.
Figure 7:
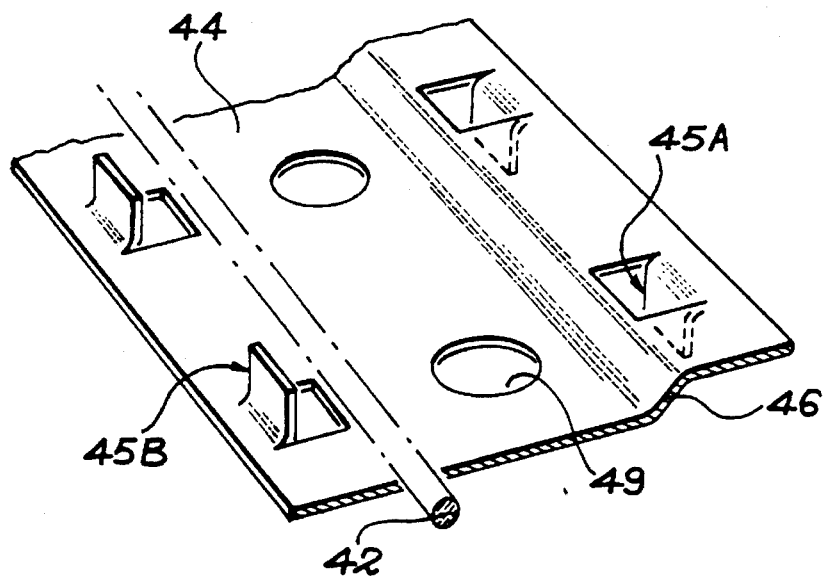
FIG. 7 is a top view of the linking element used in the embodiment of FIG. 6.

With reference to FIGS. 6 and 7, it is possible to envisage using linking elements constituted by one curved central portion 44 so that the ends 41A and 41B of the linking element are not located in the same plane but are parallel to one another. In this case, this central portion 44 comprises a deformation 46, preferably non-central, so as to be able to provide one or several central holes 49 in a flat portion of this central portion 44. This makes it possible to provide projections 45A and 45B with a relatively large bending radius and thus increased solidity, having regard to the fact that a small bending radius could constitute the source of a rupture.

A linear joint 42 may then be provided between the two annular sectors 47A and 47B. Similarly, one of several braces 43 may be provided between them. They make it possible to regulate crushing of the linear joint 42. Thus, it is possible to ensure an extremely high degree of imperviousness.

Figure 8:
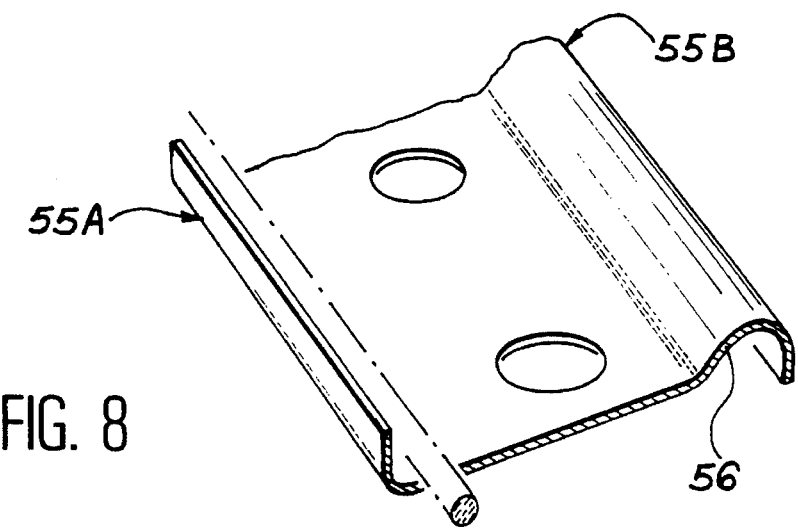
FIG. 8 is a top view of another linking element able to be used in the embodiment of FIG. 6.

With reference to FIG. 8, a linking element may have projections 55A and 55B constituted by the ends of the plate constituting it. In this case, it advantageously has a central portion so as to adjust the spacing between the sectors to be interconnected.

The composite annular sectors do not undergo any shearing or extension forces.

The geometry and mechanical resistance of the assembled structure depends on the quality of the contour of the annular sectors and does not depend on the quality of the piercings required for fixing. It is then possible to freely enlarge the production tolerances of these piercings and even avoid embodying counter-piercings. Thus, the cost and machining time of these annular sectors is reduced.

What is claimed is:

1. A sectorized tubular structure subject to implosion which comprises:

a plurality of annular composite sectors overlapped with respect to one another and forming at least one tubular portion, a plurality of linking elements fixing the annular sectors together, wherein the linking elements comprise metallic plates including at least one central portion and at least two ends perpendicular to the central portion and parallel to each other with one annular sector resting on each of said ends wherein the ends of said linking elements comprise projections forming the central portion and include a convex surfaced stop which engages one of the annular sectors wherein each of said annular sectors substantially overlap the linking element on one face of the linking element.

2. A tubular structure according to claim 1, wherein the annular sectors have fixing holes formed therein and the linking elements further comprise at least one central hole or one opening formed therein in a central portion thereof and wherein fixing members are located in the fixing holes and interconnect the annular sectors with the linking elements, the fixing members having diameters which are smaller than diameters of the holes of the annular sectors and linking elements so that there is no contact therebetween.

3. A tubular structure according to claim 2, wherein the fixing members are located, respectively, in the hole or opening of the linking elements 4. A tubular structure according to claim 1, wherein each linking element comprises at least two projections at each end.

5. A tubular structure according to claim 1, wherein the central portion of each linking element is curved so that opposite ends of each said linking element are in planes parallel to each other so that the two overlapping annular sectors are spaced from said inclination by each said linking element.

6. A tubular structure according to claim 5, which comprises a linear joint placed between two of said annular sectors.

7. A tubular structure according to claim 5, which comprises at least one brace placed between said two annular sectors.

* * * * *